United States Patent [19]

Negethon, Jr.

[11] Patent Number: 4,735,752

[45] Date of Patent: Apr. 5, 1988

[54] METHOD FOR FORMING TAXIDERMIC MODEL PARTS

[76] Inventor: Eugene Negethon, Jr., Box 244, Rte. 2, Eustace, Tex. 75124

[21] Appl. No.: 843,622

[22] Filed: Mar. 25, 1986

[51] Int. Cl.$^4$ .................. B29C 33/40; A61C 13/087
[52] U.S. Cl. ........................ 264/19; 264/20; 264/78; 264/222; 264/227; 264/245; 433/203.1; 434/296
[58] Field of Search ............ 264/18, 20, 28, 222, 264/223, DIG. 30, 74, 73, 78, 19, 227, 245; 40/160; 433/26, 203.1; 434/296

[56] References Cited

U.S. PATENT DOCUMENTS

| | | | |
|---|---|---|---|
| 1,667,205 | 4/1928 | Ingwersen | 434/296 |
| 2,306,464 | 12/1942 | Nowotny | 434/296 |
| 2,659,970 | 11/1953 | Ingersoll, Jr. | 264/18 |
| 2,944,293 | 7/1960 | Taylor | 264/73 |
| 3,286,693 | 11/1966 | Clarke, Jr. et al. | 264/28 |
| 3,431,330 | 3/1969 | Cornell | 264/18 |
| 4,335,067 | 6/1982 | Castamo | 264/222 |
| 4,457,713 | 7/1984 | Schneider | 264/18 |
| 4,521,193 | 6/1985 | Cialone | 264/18 |
| 4,559,189 | 12/1985 | Wegener, II | 264/222 |

FOREIGN PATENT DOCUMENTS 242006 12/1985 Japan ................. 264/222

Primary Examiner—James Lowe
Attorney, Agent, or Firm—Jerry W. Mills; Roger N. Chauza

[57] ABSTRACT

A taxidermic specimen and a method of formation thereof is disclosed. A preliminary negative mold (28) is formed by applying an alginate material to the jaw structure of the animal carcass. Fibers (50) are disposed within the depressions (30, 32 and 34) to provide tooth stains. Tooth-colored acrylic material is alternately poured in layers into the teeth depressions (30, 32 and 34) of the preliminary mold (28). The hardened acrylic teeth (44, 46, 48) are removed and chamfered around the gingival line (40). The teeth are reinserted into the preliminary mold (28) and covered by palate and gum forming fiberglass. Natural appearing colorations are provided comprising selected colored threads (52) near the surface of the gum structure. The composite tooth, gum and palate structure forms the master mold (54). From the master mold (54) a final rubber production mold is formed which is used to construct additional production taxidermic specimens in the same manner in which the master mold (54) was formed.

6 Claims, 1 Drawing Sheet

METHOD FOR FORMING TAXIDERMIC MODEL PARTS

TECHNICAL FIELD OF THE INVENTION

The present invention relates in general to the art of taxidermy, and more particularly relates to methods and apparatus for fabricating lifelike parts for taxidermic models.

BACKGROUND OF THE INVENTION

The art of taxidermy involves the preparation of lifelike representations of animals by preserving the skins or hides thereof, and fashioning a wooden or plastic model on which the skin of the specimen is mounted. It is a common practice to process the hide or skin by conventional techniques to preserve the natural appearance of the fur, ears, tail, nose, etc. In many instances, even the teeth of the animal carcass are extracted and reset into a plastic jaw mountable within the skull of the taxidermic model. Success in the art of taxidermy is judged by considerations of authenticity and cost.

A popular technique for mounting game animals and fish is to show the specimen bearing its teeth. The viciousness of the animal is thus apparent. However, many parts of the animal mouth desirable for viewing cannot be easily preserved. These include, for example, the tissue forming the gum, palate and tongue. While the remounting of the original teeth constitutes the utmost in retaining the authenticity of the taxidermic specimen, such measure is time consuming and expensive. As a result, mass production techniques have been employed to provide reasonably lifelike plastic models of taxidermic animal parts. For instance, one may obtain in quantities artificial eyes, tongues, and upper and lower jaws of many game animals and birds. Such parts are then mounted within a styrofoam or plastic model of the taxidermic specimen over which the original preserved skin or hide is mounted. By having available the various parts of the popular game animals, the taxidermist is able to "construct" a specimen which appears lifelike.

The present known techniques employed in mass producing taxidermic specimen parts are not without their attendant disadvantages. For example, the upper and lower jaw parts of many taxidermic specimens are formed by vacuum mold techniques, wherein a piece of flat pliable plastic is formed over a mold having the characteristics of the desired specimen. The taxidermist must then separately paint the teeth, palate and gum areas to achieve the lifelike characteristics of the animal. It is apparent that each taxidermist must have a high degree of skill to create these lifelike characteristics. Moreover, this artistry must be repeated for each specimen the taxidermist produces. According to conventional techniques, a paint shield is supplied with the plastic jaw parts to cover the teeth so that the gum and palate areas can be painted without disturbing the painted areas of the teeth.

From the foregoing, it may be seen that a need exists for a technique to reproduce in quantities prefabricated taxidermic specimen parts which require little skill on the part of the taxidermist, and which are more lifelike than existing specimen parts.

SUMMARY OF THE INVENTION

In accordance with the present invention, a technique for fabricating taxidermic specimen parts is provided which substantially eliminates or reduces the problems associated with the prior techniques.

According to the invention, a preliminary mold of the upper and lower jaw members of the desired taxidermic specimen are first constructed. Dental alginate is utilized to make the preliminary mold from the upper and lower jaw of the animal carcass. The teeth of the taxidermic specimen are formed separately from the gum and palate areas by first pouring into the preliminary mold, in the teeth depressions, alternate layers of an acrylic monomer and liquid hardener. The layered composition, together with added dye coloring and fibrous threads intermingled therein produce a lifelike animal tooth.

After the acrylic teeth have cured and thus hardened, each such tooth is removed from the alginate. A shallow groove is ground around the gingival line and each tooth is reinserted into the alginate mold.

A fiberglass resin and hardener together with desired colors and dyes are next poured into the alginate mold, over the molded acrylic teeth. While the fiberglass material is in a liquid state, or before pouring it into the mold, reddish colored fibers may be placed in the mold to represent surface blood veins and capillaries in the gum and palate area. Also, white and dark colored liquid dyes can be injected into the soft fiberglass to provide gum and palate coloring characteristic of the particular animal. The composition is allowed to harden and form the master mold of the taxidermic specimen part. From the master mold, a second negative impression production mold is constructed. The second mold is formed by flowing a hot melt rubber over the master mold. When the hot melt rubber solidifies, a production mold is formed which is suitable for constructing many taxidermic specimen parts in a manner substantially identical to the formation of the master mold.

In accordance with the invention, the tongue of the animal carcass is reproduced as artificial specimens by first removing the tongue from the animal and freezing it until it is solid. An alginate material is again used to provide a contoured negative impression mold according to the surface texture of the tongue. A master mold is made out of a fiberglass resin and hardener, with appropriate color dyes. From the master mold, a second negative impression rubber mold is formed, which provides the production mold for producing taxidermic tongue specimens of the desired animal.

BRIEF DESCRIPTION OF THE DRAWINGS

Further features and advantages of the present invention will become apparent from the description of an illustrative technique thereof, taken in conjunction with the accompanying drawings, in which.

DETAILED DESCRIPTION OF THE INVENTION

Figure 1:
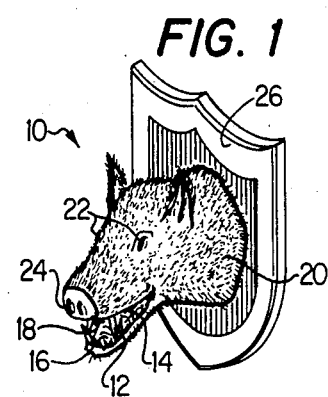
FIG. 1 illustrates a typical taxidermic specimen with which the present invention may be advantageously practiced.

The invention is best understood by referring first to FIG. 1 of the drawings. As noted, taxidermic specimens are generally mounted so as to give an appearance of viciousness. Accordingly, the visibility of the teeth is highly important in this type of pose. For illustrative purposes, FIG. 1 shows a javelina animal 10 with the prominent canine teeth 12 and 14 formed in the respective lower jaw 16 and the upper jaw 18.

In the current art of taxidermy, the upper and lower jaw specimens 16 and 18 are catalogue purchased items, and are set into a cranial styrofoam support (not shown) over which the hide 20 is mounted. The eyes 22 are also artificial, as well as in many instances the nose 24. The hide 20 of the specimen is mounted to the styrofoam form and carefully adhered around the mouth opening and eyes so as to produce a lifelike model. Of course, the specimen is often mounted to a wall support 26.

Figure 2:
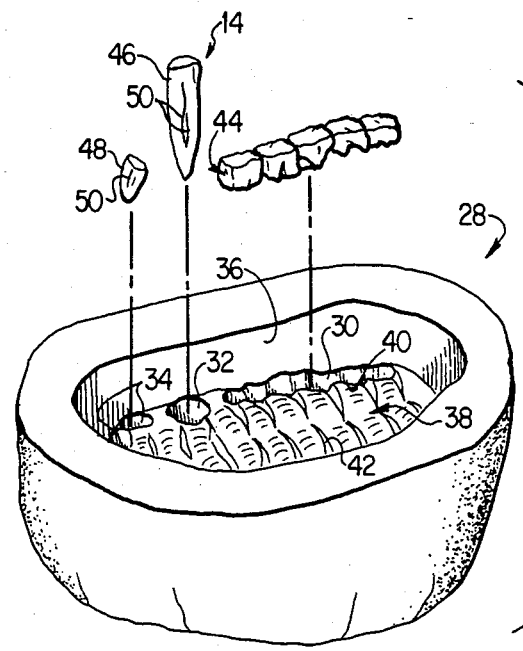
FIG. 2 depicts the preliminary negative mold used to form a master mold of the composite gum, palate and teeth of the jaw structure.

In accordance with the invention, a preliminary soft mold, comprising a negative impression of the animal part, is constructed as shown in FIG. 2. As noted above, the technique of the invention will be described in connection with the formation of the upper jaw, including the teeth, of the animal shown in FIG. 1. FIG. 2 illustrates a preliminary soft mold 28 for fabricating the upper jaw 18 and teeth 14 specimens of the animal carcass. The preliminary soft mold 28 is formed by using a soft pliable impressionable material, such as dental alginate, and pressing it onto and around the teeth of the upper jaw 18 of the animal carcass. In this manner, the contour of the jaw 18 and teeth 14 are reproduced as a negative impression within the preliminary soft mold 28. The preliminary mold 28 also includes depressions 30 forming the molar teeth, depressions 32 forming the eye or canine teeth which, for the animal noted, are exceptionally deep. Depressions 34 are also formed as negative impressions of the incisor teeth.

The exterior gum area 36 is contoured and forms the vertical sidewall of the preliminary mold 28. The palate area, generally shown as 38 forms the roof of the specimen mouth. The periphery of the palate area 38 which circumscribes the edge of the teeth depressions 30-34 forms the gingival line 40. Also shown are the palate ridges 42 which arch upwardly in accordance with the traits of the particular subject animal. It should be understood that a similar preliminary mold is constructed of the lower jaw 16 of the animal.

In accordance with the technique of the invention, the individual teeth are formed using the preliminary mold 28. An acrylic material is utilized for forming the teeth as such material can be color blended to provide the appropriate color and natural appearance of teeth. The acrylic material utilized includes a self-curing monomer (powder) and a liquid hardener mixed together and deposited within the teeth depressions 30-34, as described below. Acrylic material suitable for use can be obtained from Luxit Acrylic Mfg. Co., P.O. Box 6921, Kansas City, Mo. 64130. The color of animal teeth vary significantly, depending upon the type of animal being modeled. For example, clean animals such as a bobcat or fox have ivory-colored teeth. Other animals, such as the beaver, javelina and bear have teeth which tend to be more brown. Acrylics suitable for use according to the present invention are available in colors ranging from white to brown, and are categorized according to a corresponding number 59-81. The lower order numbers would be suitable for forming teeth of the bobcat and fox family while numbers nearer the higher range would be suitable for the beaver, javelina and bear family.

When the correct color of acrylic material has been selected in accordance with the coloring of the animal teeth, the acrylic materials, comprising a powder and a liquid, are mixed together and alternately deposited in thin layers within the teeth depressions 30-34 of the preliminary mold 28. All the teeth depressions 30-34 are filled in this layered manner up to the gingival line 40 of the preliminary mold 28. The acrylic material begins setting in about five to ten minutes. In those situations where it is desired to form discolorations on the teeth which are characteristic of bark or grass stains, appropriately colored fibers 50, such as thread, are immersed within certain teeth depressions prior to the acrylic material. Preferably, the threads are placed within the selected teeth depressions so as to be vertically oriented, and close to the outer surface of the tooth. In this manner, the thread is visible through the acrylic material and thus appears as a stain often found on animal teeth. The layered acrylic material is then poured into all the teeth depressions and allowed to harden.

FIG. 2 also illustrates the molar teeth 44, the canine teeth 46 and the incisor teeth 48 in the hardened state and removed from the mold. The fibers corresponding to stains which typically appear on the canine teeth 46 and incisor teeth 48 are shown by reference character 50. The hardened acrylic teeth are carefully removed from the preliminary mold 28 by tweezers, or the like, and chamfered slightly around the gingival line 40. The chamfer or shallow groove formed at the gingival line 40 provides a much more lifelike appearing set of teeth when the palate material is formed therearound. Depending on the nature of the animal, or according to the request of the customer, the teeth may be polished to provide a shiny surface. Otherwise, the teeth retain a dull nonglossy appearance which is characteristic of the hardened acrylic formed in the negative impression mold. After appropriate grinding, the teeth are reinserted into their respective teeth depressions 30-34. Because the preliminary mold 28 comprises a dental alginate material, care is taken not to disturb the contoured surfaces of the mold by the removal or the insertion of the teeth 44-48.

Continuing with the technique, a conventional fiberglass or epoxy material is poured into the preliminary mold 28 to form the gum and palate structures. In order to create lifelike effects of the gum and palate areas, a small amount of the white acrylic material may first be poured at selected locations into the mold at palate ridge areas 42 to lightly line or streak such areas. A bony effect is thus created. In a similar manner, purple or black colored acrylic can be deposited in the mold to produce darkened gum or palate areas. The backside of the palate area 38 and the gum area 36 of the molar teeth 44 represent areas which typically are darker colored. Because the preliminary mold 28 is a negative impression, the white acrylic material in the palate ridges 42 will be visible, and thus will reproduce the characteristic colors of the animal mouth structure.

Also, at selected locations around the external gum area 36 and on the bottom of the palate 38 a few reddish-colored fibers may be deposited to resemble surface blood veins and capillaries distributed around the mouth. This feature of the invention provides an enhanced authenticity of the taxidermic specimen, not heretofore achieved by the techniques in the art. After the formation of these characteristic features is completed, a thin layer of a pink fiberglass or epoxy liquid is poured into the preliminary mold, covering the top surfaces of the teeth 44-48, as well as the palate area 38 and gum 36. The preliminary mold 28 is filled with the remaining pink-colored fiberglass material. Again, appropriate dyes are available for coloring the fiberglass liquid to match the gum and palate structures of the animal. Fiberglass or epoxy materials comprising a hardener and a resin are conventionally available for use in accordance with the techniques of the invention. While the acrylic could be used to construct the entire taxidermic specimen, it is advantageous for purposes of cost to use the acrylic only for fabricating the teeth. Fiberglass fibers or threads may be emersed within the liquid fiberglass to accelerate hardening of the material. The fiberglass material provides an excellent bond to the acrylic teeth, thereby providing a composite master mold 54 as shown in FIG. 3.

Figure 3:
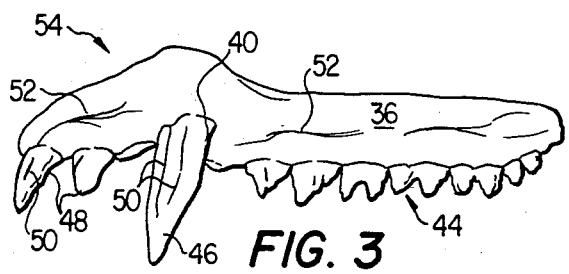
FIG. 3 is an illustration of the master mold of a taxidermic specimen.

In FIG. 3, the master mold 54 provides a record of the exact characterization of the animal part. Therefore, when additional taxidermic specimens are fabricated, they can be formed substantially identical to the master mold 54, including all of the color and shape characteristic of the particular animal. For example, there are shown the vertical fibers or threads 50 forming bark stains on the canine teeth 46 and the incisor teeth 48. The fibers 52 in the gum area 36 form lifelike surface capillaries and vessels. Additional palate coloring and surface fibers provide a lifelike appearing structure in the palate area. Also, because of the prior grinding of the teeth along the gingival line 40, the adhesion of the fiberglass gum and palate material to the acrylic teeth form a natural contoured interface.

From the master mold 54, a second negative impression mold is formed, using a hot melt rubber. A rubber suitable for this purpose is identified as Silicone Casting Rubber, RTV 500, and is obtainable from Hastings Plastic Co., Santa Monica, Calif. The master mold 54 is placed into a shallow container and the liquified rubber is poured therein to completely cover the master mold 54. This type of rubber is suitable for use in accordance with the invention as there is no adherence thereof to the acrylic and fiberglass material of the master mold 54. The liquified rubber is allowed to cool and solidify into its natural resilient state. The production rubber mold thus formed from the master mold 54 appears substantially identical to the preliminary mold 28 of FIG. 2, but is durable and reusable for production purposes. Because the production mold appears in all respects like the preliminary mold 28, it is not repeated as a separate figure. In the alternative, those skilled in the art may desire to form a negative impression rubber production mold directly from the animal carcass, rather than producing an intermediate preliminary mold.

Using the rubber production mold, a number of taxidermic specimen models of the animal mouth can be constructed. Such models can be constructed in the manner substantially identical to the technique in which the master mold 54 is formed. Accordingly, the production taxidermic specimens include the same shape and the lifelike appearance as that of the original animal.

As noted above, the taxidermic jaw model is generally mounted within a plastic or styrofoam frame structure with the animal hide stretched thereover. A putty or clay known as scupall is packed between the jaw model and frame or animal skin to form a unitary bridging membrane structure. An appropriate precolored dental acrylic is then painted over the clay to provide a skin-looking appearance to the internal mouth of the taxidermic animal speciman.

Figure 4:
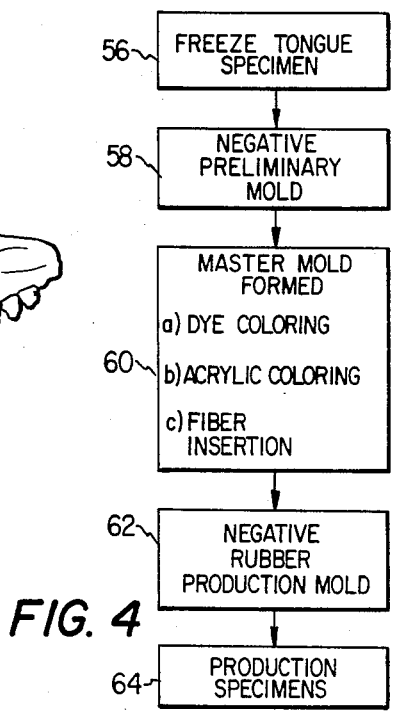
FIG. 4 illustrates the steps in fabricating a taxidermic tongue specimen in accordance with the techniques of the invention.

Taxidermic tongue specimens can also be constructed in accordance with the techniques of the invention. In FIG. 4, a flow chart illustrates the steps in forming taxidermic tongue specimens. In the step of the technique showed in block 56, the tongue of the animal carcass is removed and frozen in the shape desired to a solid form. As noted in block 58, a negative preliminary mold is formed around the frozen tongue, using the alginate material as described above. By the use of the alginate material, the roughness of the top surface of the tongue, as well as other normal and abnormal characteristics are formed in the negative impression of the tongue mold.

Shown in block 60 are the steps in forming a master mold of the tongue specimen. A colored fiberglass hardener and resin are poured into the negative impression preliminary mold. A pink or flesh-colored dye, matching the color of the animal tongue, is used to produce the lifelike tongue model. Whitish areas, corresponding to the taste buds of the tongue may be deposited in the mold by using the white acrylic-colored material. Also, blood veins and other discolorations may be added in the nature of fibers inserted into the mold cavity, near the surface so as to be visible.

The alginate material of the negative preliminary mold is then removed and discarded, providing the fiberglass master model of the tongue. From this master model, a negative production mold is formed by using a hot melt rubber, substantially in the manner described above in connection with the jaw specimens. The rubber production mold thus provides the mechanism by which many additional tongue specimens can be produced. The production of many tongue specimens, as noted in block 64 of FIG. 4, is produced in substantially the same manner as the master mold as noted in block 60.

From the foregoing, an improved taxidermy method has been disclosed which allows taxidermic models to be produced using synthetic materials and which appear more lifelike than those heretofore provided. In executing the steps of the technique, those skilled in the art may prefer to use suitable materials other than disclosed above. In accordance with the invention, a temporary negative mold is first formed from the animal carcass, from which a master model of the specimen is constructed. The master model of the specimen is constructed by flowing an acrylic material into the teeth depressions of the mold. The layered composition of the acrylic powder and liquid, together with colored threads provide an authentic appearing tooth structure. A fiberglass liquid is then poured into the temporary mold, which adheres to the acrylic teeth. Various colorations and fiber components are added to the liquid fiberglass to provide palate and gum colorations, as well as provide surface blood vessels and capillaries. From the master mold, which in all respects appears like the animal carcass part, a rubber negative production mold is formed. The rubber production mold is durable and resilient, and can accommodate the formation of many taxidermic specimens fabricated in a manner substantially identical to the formation of the master mold. The process according to the invention can be used to form animal tongue specimens. The tongue specimen is first frozen before a preliminary mold is formed therefrom.

According to the foregoing technique, many changes can be made which are not relevant to the novel features taught by the invention. Bearing this in mind, the specific embodiments disclosed herein are intended to be merely exemplary of the invention and not restrictive thereof since various modifications readily apparent to those familiar with the art can obviously be made without departing from the spirit and scope of the invention as claimed hereinbelow. For example, the concepts of the invention may be employed to fabricate many body parts, internal and external, for laboratory or educational purposes. Moreover, those skilled in the art may prefer to adopt only some of the advantageous features of the invention, rather than all the features, in forming taxidermic specimens.

What is claimed is:

1. A method of fabricating a specimen of a body part, comprising the steps of:

forming a preliminary mold having a negative impression of the body part;

forming a master mold using the preliminary mold, and forming said master mold as a replica of said body part having substantially all the color and contour characteristics of the body part;

forming a final negative impression mold using said master mold; and forming a plurality of specimens of the body part using the final negative mold and forming said specimens in accordance with the color and contour characteristics of said master mold.

2. The method of claim 1 wherein the preliminary mold is formed using an alginate material.

3. The method of claim 1 wherein the final negative mold is formed by pouring a liquified rubber over sadi master mold, and allowing the rubber to cure to a resilient state.

4. The method of claim 1 further including forming said master mold using a colored acrylic material and an epoxy material, and forming said specimen substantially identical to said master mold using a colored acrylic material and an epoxy material.

5. The method of claim 4 further including forming a jaw part by forming the teeth thereof with the colored acrylic, and forming the palate and gum material with the epoxy material.

6. The method of claim 1 further including freezing the body part before forming the preliminary mold therefrom.

* * * * *